Nov. 2, 1971  D. L. RUGER  3,616,726

POWER TRANSMISSION

Filed April 2, 1970  2 Sheets-Sheet 1

INVENTOR.
Dean L. Ruger
BY
ATTORNEY

Nov. 2, 1971  D. L. RUGER  3,616,726

POWER TRANSMISSION

Filed April 2, 1970  2 Sheets-Sheet 2

INVENTOR
Dean L. Ruger
BY
ATTORNEY

United States Patent Office 3,616,726
Patented Nov. 2, 1971

3,616,726
POWER TRANSMISSION
Dean L. Ruger, Camden, Mich., assignor to
Sperry Rand Corporation, Troy, Mich.
Filed Apr. 2, 1970, Ser. No. 25,123
Int. Cl. F04b 1/02
U.S. Cl. 91—488                                    4 Claims

ABSTRACT OF THE DISCLOSURE

A variable displacement axial piston pump of the inline type is arranged to reduce commutation noise by gradual decompression of the fluid trapped in the cylinder at top dead-center. The decompression means is variable with changes in swash plate tilt and takes place principally through the piston shoes and a bleed hole in the swash plate at small angles of tilt; which bleed hole is progressively closed as the tilt angle increases, allowing decompression to take place through piston motion at larger tilt angles.

---

Modern hydraulic pumps operating at high speeds and at high pressures produce considerable noise which, in many applications, is objectionable. One source of the noise arises from valve plate commutation at top dead-center where the fluid trapped in each passing cylinder is suddenly transferred from delivery pressure to intake pressure. If noise is to be significantly abated, provision must be made at top dead-center to gradually decompress the trapped fluid before the cylinder becomes connected with the intake port. Numerous proposals have been made for dealing with this problem and one which is widely used involves an extension in the direction of rotation of the sealing land at top dead-center so that the initial retraction of each piston will decompress the trapped fluid before opening is made to the intake port. This is satisfactory for pumps of fixed displacement operating against a substantially constant pressure head, but does not effectively reduce noise in pumps of the variable displacement type. When such a pump is at the zero flow condition, there is no piston motion to allow mechanical decompression of the trapped fluid which is suddenly decompressed when exposed to intake, thus causing fluid noise and outgassing as well as eventual cavitation erosion.

It is an object of the present invention to provide an improved decompression arrangement for variable displacement piston pumps in which gradual decompression can occur regardless of the displacement setting at which the pump is momentarily operating.

A further object is to provide in a pump of this type a means for decompressing the fluid trapped in the pump cylinders during commutation by opening a bleed path through the piston, the piston shoe and the swash plate during the period when decompression is required while the pump is adjusted for zero or small displacement.

Figure 1:
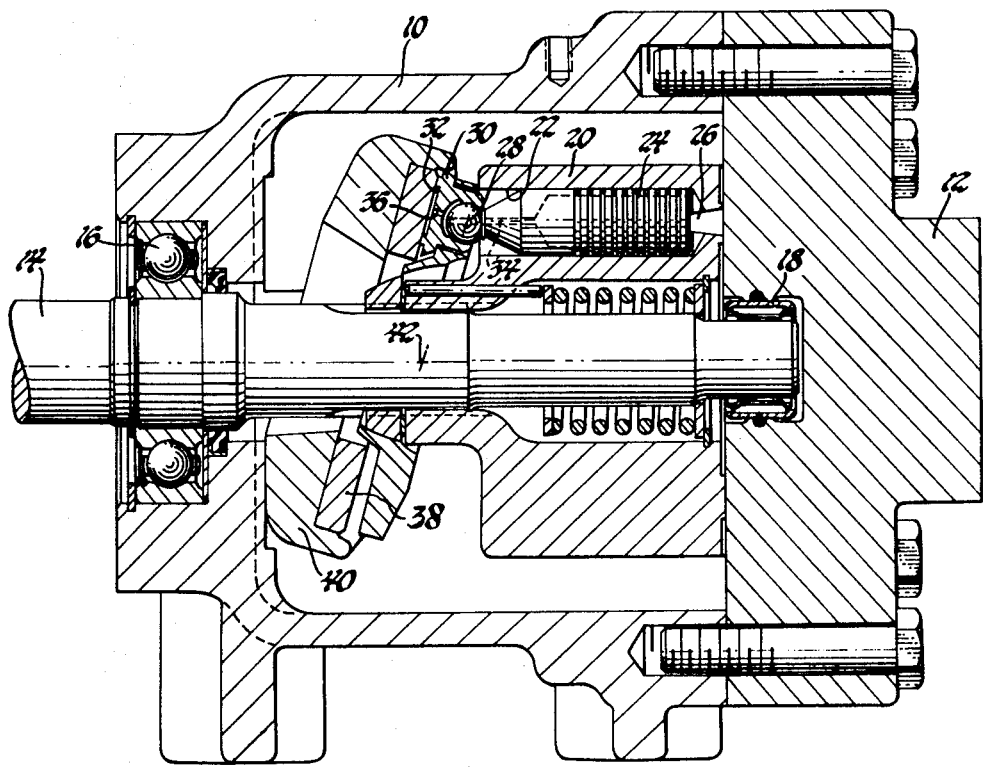
FIG. 1 is a longitudinal cross section of a variable displacement inline piston pump incorporating a preferred form of the present invention.

As shown in FIG. 1, a variable displacement inline piston pump comprises a housing 10 of generally cup-shape, the right hand end of which is closed by a closure member 12. A shaft 14 is journalled in bearings 16 and 18 in the housing and closure respectively. Splined to the shaft is a revolving cylinder barrel 20 having a plurality of cylinder bores 22 carrying slidable pistons 24. The cylinder barrel 20 abuts the left face of the closure member 12 which is provided with commutating porting, later to be described, and which cooperates with the respective cylinder ports 26.

The pistons 24 have ball ends 28 on which are swaged sliding shoes 30 which have balancing cavities 32 of substantially equal diameter to the cylinder bores 22. The cavities 32 are in communication with the cylinder bores through passages 34 and 36 in the pistons and shoes respectively. The shoes 30 slide around on the flat annular swash plate 38 which is carried by a tiltable yoke 40. The yoke 40 is supported in the housing 10 for tilting about an axis 42 by means of the usual trunnions, not illustrated. The tilt angle may be controlled by any suitable displacement control mechanism of a type well known in the art; such, for example, as a servopiston controlled in response to the delivery pressure of the pump to maintain that pressure relatively constant.

Figure 2:
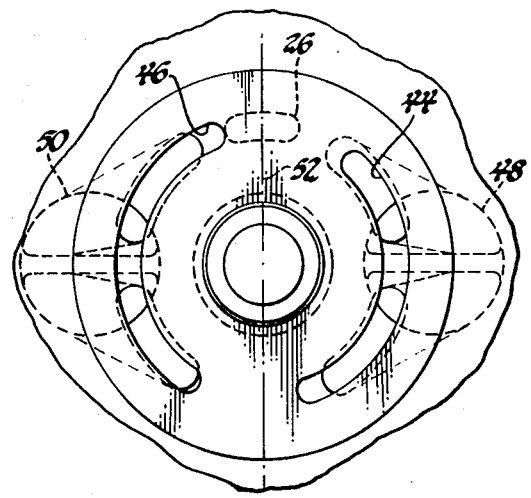
FIG. 2 is a face view of the valve plate incorporated in the pump of FIG. 1.

Referring now to FIG. 2, the arrangement of the inlet and outlet ports on the valve plate face of the closure 12 is there illustrated. For a pump in which the cylinder barrel rotates clockwise against the valve plate face, the arcuate intake port is shown at 44 and the arcuate delivery port at 46. These connect by cored passages, shown in dotted lines, with their respective terminal connections 48 and 50. The commutating or cut-off land at top dead-center 52 is extended clockwise considerably beyond the edge of cylinder port 26, shown in its initial commutating position in dotted lines. By top dead-center is meant the point in the cycle of an individual piston where the clearance volume in the cylinder is a minimum.

At this point, the fluid in the clearance volume is trapped after having been cut off from the delivery port 46 and it is desirable before opening the cylinder port 26 to the intake passage 44 that this fluid be gradually decompressed down to a pressure approximating that in the intake passage. When the swash plate 38 is at or near its maximum angle of tilt, the retraction stroke of the piston which commences at top dead-center and proceeds until the port 26 progressesses to its opening to suction port 44, serves well to accomplish this purpose. However, when the swash plate is at or near the position of zero tilt and the pressure is being maintained in the delivery passage 50, the trapped fluid in the cylinder will be decompressed inadequately or not at all by piston motion, resulting in shock, noise and erosion of the valving surfaces.

Figure 3:
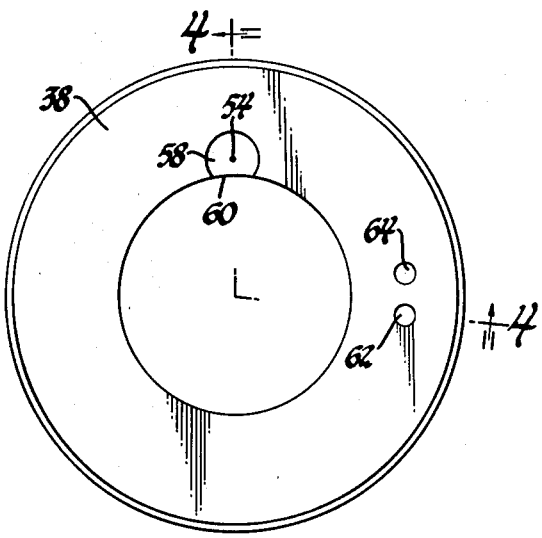
FIG. 3 is a back view of the swash plate incorporated in the pump of FIG. 1.
Figure 4:
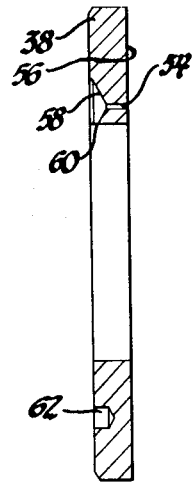
FIG. 4 is a cross section taken on line 4—4 of FIG. 3.

To avoid this, the present invention provides a bleed path back through the piston, the piston shoe and the swash plate to the interior of the case and takes advantage of the geometrical relationship between the swash plate and the piston shoe to control this bleed path so that it is effective only when needed. For this purpose, a bleed hole indicated at 54 (FIG. 3) is drilled into the working face 56 of the swash plate 38. A counterbore 58 in the rear face of swash plate 38 provides an opening at 60 to the interior of the housing. The swash plate 38 is provided with a pair of dowell recess 62 and 64 in its rear face, either one of which may cooperate with a dowel pin, not shown, in the yoke 40. By locating such a dowel pin half way between top and bottom dead-center, then by using the dowel hole 62, the bleed hole 54 will be positioned a few degrees past top dead-center for pumps which rotate counterclockwise in FIG. 3 and hole 64 will act in a similar way for clockwise rotation pumps.

Figure 5:
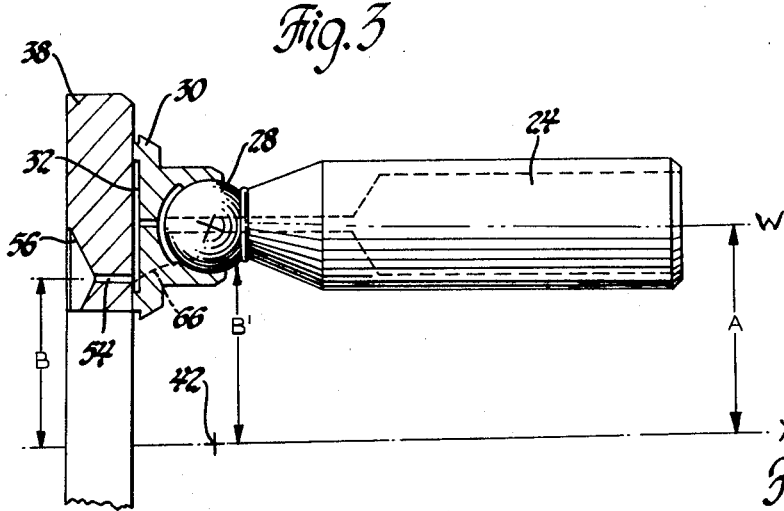
FIGS. 5 and 6 are diagrammatic views of the piston, piston shoe and swash plate of the pump, showing the parts in two different positions.
Figure 6:
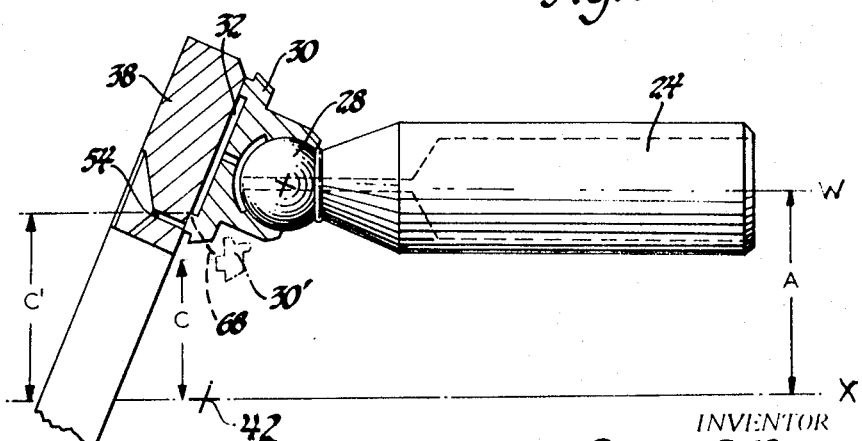

Referring now to FIGS. 5 and 6, the geometrical relationships between the swash plate 38 and shoes 30 are diagramed. FIG. 5 illustrates the position of the parts at zero tilt of the swash plate and FIG. 6 represents the position at maximum tilt. In both FIGS. 5 and 6, the radius A from the shaft center line W to the piston center line X is constant. In FIG. 5, the bleed hole 54 is in communication with the balancing cavity 32 and lies at a radius B from the shaft axis W. If the swash plate 38 were to be swung about the trunnion axis 42, the edge of the bleed hole 54 would traverse a curved path as indicated by the dotted line 66 in FIG. 5. When it had reached maximum displacement, it would be at a radius B' from the shaft axis W. Tilting the swash plate, however, also tilts the shoe 30 about the center of the ball 28, as shown in FIG. 6. The inner edge of the cavity 32 thus moves from the dotted line position indicated at 30' along the dotted arc 68 and thus has moved from its initial radius C to a longer radius C' from the shaft center line W. Radius C' is longer than radius B'. This movement has fully cut off communication between the bleed hole 54 and cavity 32. This occurs at an angle of tilt intermediate between the angles illustrated in FIGS. 5 and 6.

Thus, at zero tilt and at small angles of tilt where decompression of fluid trapped at top dead-center will not be accomplished by piston retraction, the bleed hole 54 serves to decompress the trapped fluid. At larger angles of tilt where piston retraction is adequate to accomplish decompression, the bleed hole 54 is cut off and rendered ineffective. At intermediate angles of tlt, the bleed hole and the piston retraction both function in decompression, each gradually increasing and decreasing in opposite phase. In this way, noise levels in high pressure variable displacement pumps operating in constant pressure systems have been very materially reduced along with a reduction in fluid outgassing and cavitation erosion.

I claim:

1. A variable displacement axial piston pump of the inline type having a rotatable cylinder barrel carrying a plurality of reciprocable pistons, a stationary value plate having arcuate inlet and outlet ports separated by top and bottom dead-center sealing lands, the land at top dead-center being extended a substantial distance in the direction of cylinder barrel rotation, a swash plate mounted for tilting motion, ball jointed piston shoes slidable around the swash plate, and each having a fluid balancing cavity exposed to cylinder pressure and defined by an annular sealing ring, the shoes partaking of an elliptical path on the swash plate, the major axis of which increases with increasing tilt of the swash plate, the swash plate having a bleed hole located opposite the top dead-center sealing land of the valve plate for decompressing through the balancing cavities the pressure fluid trapped in their respective cylinders at top dead-center.

2. A pump as defined in claim 1 wherein the location of the bleed hole with respect to the path of the balancing cavities is chosen to provide an effective bleed opening which varies with the angle of tilt of the swash plate.

3. A variable displacement axial piston pump of the inline type having a rotatable cylinder barrel carrying a plurality of reciprocable pistons, a stationary valve plate having arcuate inlet and outlet ports separated by top and bottom dead-center sealing lands, the land at top dead-center being extended a substantial distance in the direction of cylinder barrel rotation, a swash plate mounted for tilting motion, ball jointed piston shoes slidable around the swash plate, and each having a fluid balancing cavity exposed to cylinder pressure and defined by an annular sealing ring, the shoes partaking of an elliptical path on the swash plate, the major axis of which increases with increasing tilt of the swash plate, the swash plate having a bleed hole located opposite the top dead-center sealing land of the valve plate and at a radial distance to be fully opened to each passing balancing cavity at minimum tilt of the swash plate and progressively closed as the tilt is progressively increased whereby gradual decompression of the fluid trapped at top dead-center will take place through the bleed hole at minimum tilt and will take place by retractive piston motion at maximum tilt.

4. A pump as defined in claim 3 wherein the swash plate comprises a ring, and selective dowel means for locating the ring with the bleed hole in one position for clockwise rotation of the cylinder barrel and in another position for counterclockwise rotation.

References Cited

UNITED STATES PATENTS

| 2,980,077 | 4/1961 | Magill | 91—488 |
|---|---|---|---|
| 3,199,461 | 8/1965 | Wolf | 91—6.5 |
| 3,362,342 | 1/1968 | Flint et al. | 91—482 |
| 3,411,608 | 11/1968 | Thoma | 91—499 |

FOREIGN PATENTS

| 883,348 | 7/1943 | France | 91—507 |

WILLIAM L. FREEH, Primary Examiner

U.S. Cl. X.R.

91—505, 490